United States Patent [19]

Schwarz et al.

[11] Patent Number: 5,572,378
[45] Date of Patent: Nov. 5, 1996

[54] DIRECT FILE ACCESS SYSTEM FOR MAGNETIC TAPE

[75] Inventors: Theodore A. Schwarz, Woodbury; Robert E. Wolff, Edina; Robert J. Youngquist, White Bear Lake, all of Minn.

[73] Assignee: Imation Corp., St. Paul, Minn.

[21] Appl. No.: 259,200

[22] Filed: Jun. 13, 1994

[51] Int. Cl.[6] .............................. G11B 5/09; G11B 15/12; G11B 15/48
[52] U.S. Cl. .............................. 360/48; 360/63; 360/74.3; 360/74.4
[58] Field of Search .................................. 360/32, 48, 63, 360/74.1, 74.4, 74.3

[56] References Cited

U.S. PATENT DOCUMENTS

| | | | |
|---|---|---|---|
| 4,498,107 | 2/1985 | Yoshimaru et al. | |
| 5,216,556 | 6/1993 | Steinberg et al. | 360/74.3 |
| 5,287,229 | 2/1994 | Saito et al. | 360/74.4 |
| 5,293,280 | 3/1994 | Ishikawa et al. | 360/74.1 |
| 5,388,012 | 2/1995 | Adams et al. | 360/48 |
| 5,420,727 | 5/1995 | Basham et al. | 360/48 |

FOREIGN PATENT DOCUMENTS

| | | |
|---|---|---|
| 9317420 | 9/1993 | WIPO. |
| 9317422 | 9/1993 | WIPO. |

*Primary Examiner*—W. Chris Kim
*Attorney, Agent, or Firm*—Charles L. Dennis, II

[57] ABSTRACT

A direct file access system for a magnetic tape where all data files begin at a designated location on the tape. The direct file access system may be used with a reduced rewind data configuration to decrease data access time. The reduced rewind data configuration divides data files into generally equal portions so that data files begin and end at the designated location on the tape, eliminating rewind sequences. A method and system for reducing the number of tape retensioning passes is included to further decrease access time.

56 Claims, 6 Drawing Sheets

5,572,378

DIRECT FILE ACCESS SYSTEM FOR MAGNETIC TAPE

BACKGROUND OF THE INVENTION

1. Field of the Invention

The present invention relates to a direct file access system for a magnetic tape and to a system for reducing the number of tape retensioning passes. The present invention also relates to a reduced rewind data configuration on a magnetic tape, which may be used in combination with the direct file access system and the system for reducing the number of tape retensioning passes.

2. Description of the Related Art

Conventional tape organization is sequential, with records/files recorded serially along the length of the tape. Files typically are recorded on a single track from the Beginning of Tape (BOT) to the End of Tape (EOT). If the file is longer than the length of the tape, the tape drive steps the head to a different track and the recording process continues back from the EOT toward the beginning. Consequently, the multiple tracks on the tape are accessed in a serpentine manner so as to appear as one long tape to the tape drive.

Advanced tape organization systems place a directory of a few kilobytes at the BOT which allows the read/write head to be moved laterally across the tape to the desired track. The tape then is advanced in a high-speed ballistic manner to the approximate location of the beginning of the desired record.

However, even with optimum organization and search algorithms such as Quick File Access (QFA), the average access to an individual record may be anywhere from ten seconds to several minutes. A sequential search can take anywhere from ten minutes to hours.

Access time is becoming an even greater problem as tapes get longer. For example, based on ⅓ of the length of the tape access, a 1,200 feet (365 m) tape has an average access time of 40 seconds at 120 inches per second (ips) (3.0 m/s). It is projected that the tape length in new 5.25 form factor tape cartridges with one-quarter inch (6.3 mm) tape will increase to between 1,500 and 1,800 feet (460 and 550 m) in the near future, further increasing access time.

Another factor that slows access to data is the automatic refresh or retensioning procedures employed every time the cartridge is loaded into the drive. This procedure causes the entire tape to be wound and rewound, At worst, this results in a 2–4 minute delay for long tapes. Additionally, if a tape is shuffled repeatedly in a short region, or if its temperature varies greatly since it was last used, the tape can lose tension to a degree that will degrade data integrity, requiring additional time consuming retensioning procedures.

In order to take full advantage of the huge data capacity available on tape cartridges, a direct file access system, a system for reducing the number of retensioning passes, and a reduced rewind data configuration for magnetic tapes is needed to reduce the average access time, preferably to less than 2 seconds.

SUMMARY OF THE INVENTION

The present invention is directed to a direct file access system for magnetic tape. A service region is established at approximately the center of the longitudinal length of the tape. Data storage areas having a plurality of data tracks extending longitudinally along the tape are defined on either side of the service region. Data files are written to either of the storage areas such that the data files all begin adjacent to the service region.

A file directory preferably is located in the service region. The read/write heads on the tape drive preferably are stored aligned with the file directory so that when a particular file is requested, the file directory is read and the read/write heads are moved laterally across the tape to the track containing the desired file.

In an alternate embodiment, several service regions may be established along the length of the tape. The distance between the several service regions preferably is determined by the length of the records to be stored on the tape. For example, the service regions may be arranged to accommodate numerous records of generally similar length, such as photographic images of a known size (e.g., x-ray images).

The service region and data storage areas preferably are demarcated by magnetic markers. The service region may also include a parking zone for parking the magnetic heads when the tape is not in use. The service region and data storage areas may be defined either by the tape drive or by the tape manufacturer.

The system for reducing the number of retensioning passes may include a force transducer proximate the read/write heads of the tape drive to monitor tape tension.

In a further embodiment, a worst case data pattern is written to the tape in an area of normally lower tape tension. When the tape is loaded into the drive, the drive reads this retensioning track and compares the actual error rate to the expected error rate for that track. If the actual error rate is greater than the expected error rate, a retensioning pass may be initiated. In a preferred embodiment, the worst case data pattern is written to the upper track at the BOT or EOT, or on the top track in the service region. The worst case data pattern preferably is located on the track furthest from the reference datum on the tape cartridge.

In yet another embodiment, the system initiates a retensioning pass after a specified number of tape tension reducing events has occurred.

In a preferred reduced rewind data configuration embodiment, data files are broken into first and second portions such that the first portion is written longitudinally along the tape starting at the BOT or service region. The second portion is written on another track starting proximate the end of the first portion and extending back towards the BOT or service region. Preferably, the first and second portions comprise generally half of the data file and are written on adjacent tracks.

In an alternative embodiment, the data file is divided into a primary portion requiring an even number of whole data tracks and a remainder portion. The primary portion preferably is written to the tape along a pair of adjacent tracks, starting and ending at the BOT or service region. The remainder portion preferably is divided into first and second portions which are written to the tape on a pair of tracks starting and ending at the BOT or service region.

In the preferred embodiment, the direct file access system is combined with the reduced rewind data configuration so that all files are written and read starting at the service region according to the reduced rewind data configuration. The preferred direct file access system and reduced rewind data configuration also is applicable to multi-channel recording in which multiple tracks are recorded simultaneously.

The preferred method includes mounting the magnetic tape in the tape drive for engagement with the read/write heads. The tape drive may be used to define a beginning area, an ending area, and a center area arranged longitudinally along the tape. A service region is defined on the tape proximate the center area. Data storage areas are defined on the tape adjacent to the service region for storing data files. The data storage areas generally have a plurality of data tracks beginning adjacent to the service region and extending longitudinally along the tape away from the service region.

The preferred method of writing data files according to the reduced rewind data configuration includes writing a first portion of a data file on a first data track in a direction extending away from the BOT or service region. The second portion of the data file is written on a different data track in a direction extending toward the BOT or service region so that all files begin and end adjacent to the BOT or service region.

In an alternative method, data files are divided into a primary portion requiring an even number of whole data tracks and a remainder portion. The primary portion is written to the tape starting at the service region and ending at the service region. The remainder portion is divided into a first portion and a second portion which also is written to the tape starting at the service region and ending at the service region. Consequently, all data files start and end at the service region, eliminating the need for advancing or rewinding the tape to access a file. Alternatively, all files may begin and end adjacent to the BOT region.

DETAILED DESCRIPTION OF THE PREFERRED EMBODIMENTS

Figure 1:
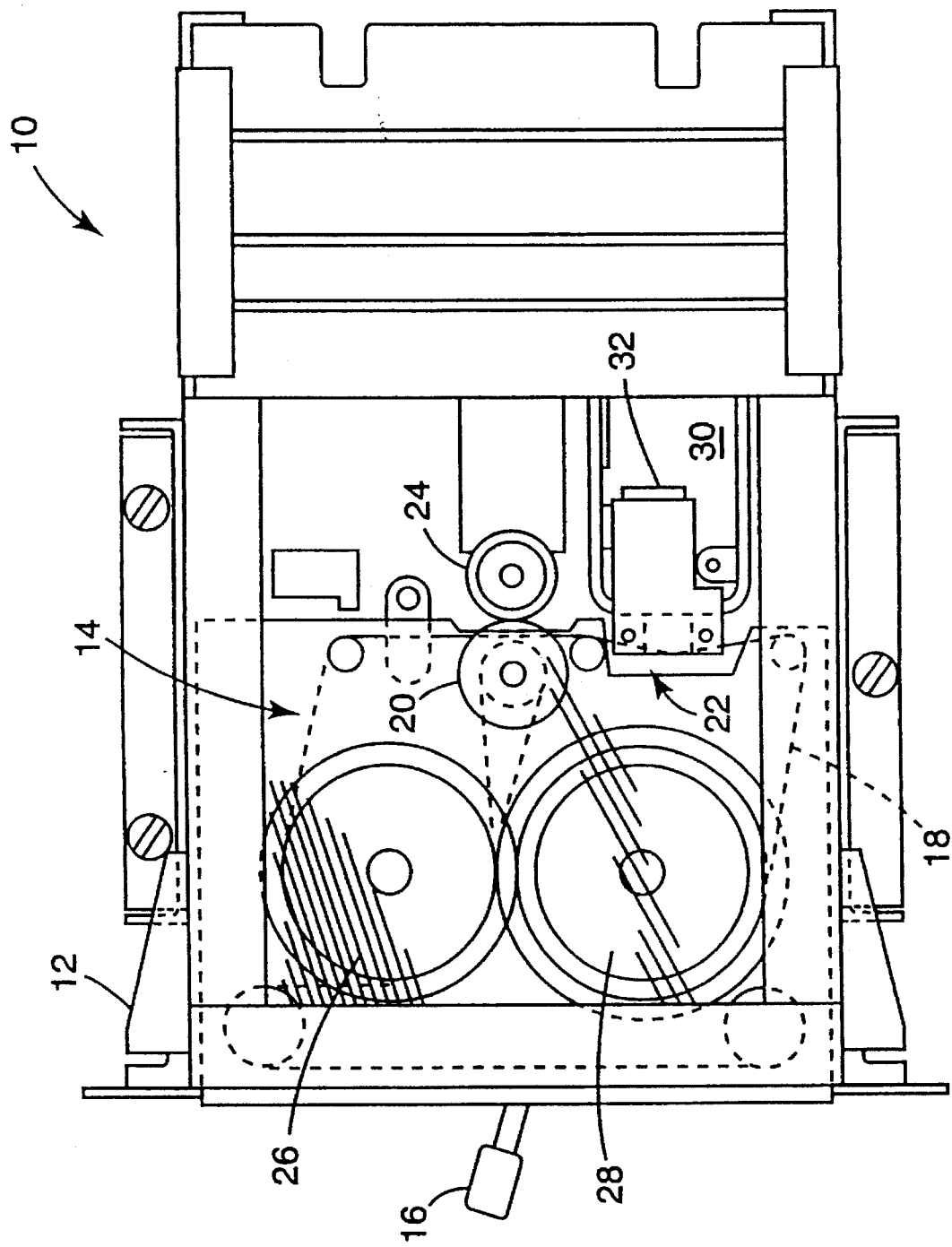
FIG. 1 is a schematic illustration of an exemplary tape drive containing a magnetic tape cartridge.

FIG. 1 is a perspective view of an exemplary tape drive 10. The tape drive 10 may perform either single channel or multi-channel recording, in which multiple channels are recorded simultaneously (in parallel) on tape 18. A frame 12 receives a double-reel cartridge 14. The tape drive 10 includes a conventional cartridge loading mechanism 16 which receives the cartridge 14, opens a tape cover (not shown) to expose tape 18, and positions the tape 18 for recording and playback. The loading mechanism 16 preferably engages a reference datum (not shown) on the cartridge 14 to align the tape 18 with a read/write head assembly 30.

The tape 18 is driven longitudinally past a read/write location 22 by a motor 24 engaged with capstan roller 20. As the tape 18 advances through the read/write location 22, data is recorded ("written") or read ("played back") from the tape by means of the read/write head assembly 30. A sensor 32 is located between the read/write head assembly 30 and the frame 12 to measure the tension of the tape 18. Alternatively, the sensor may engage the tape 18 directly or in combination with a support member.

Although FIG. 1 illustrates a belt-driven reel-to-reel cartridge, it will be understood that the present invention is not limited by the type of cartridge or the tape drive. For example, a direct drive reel-to-reel or single reel cartridge may utilize the present invention. It will also be understood that the above described tape drive 10 and cartridge 14 are for illustration purposes only, and in no way limit the scope of the present invention.

Figure 2:
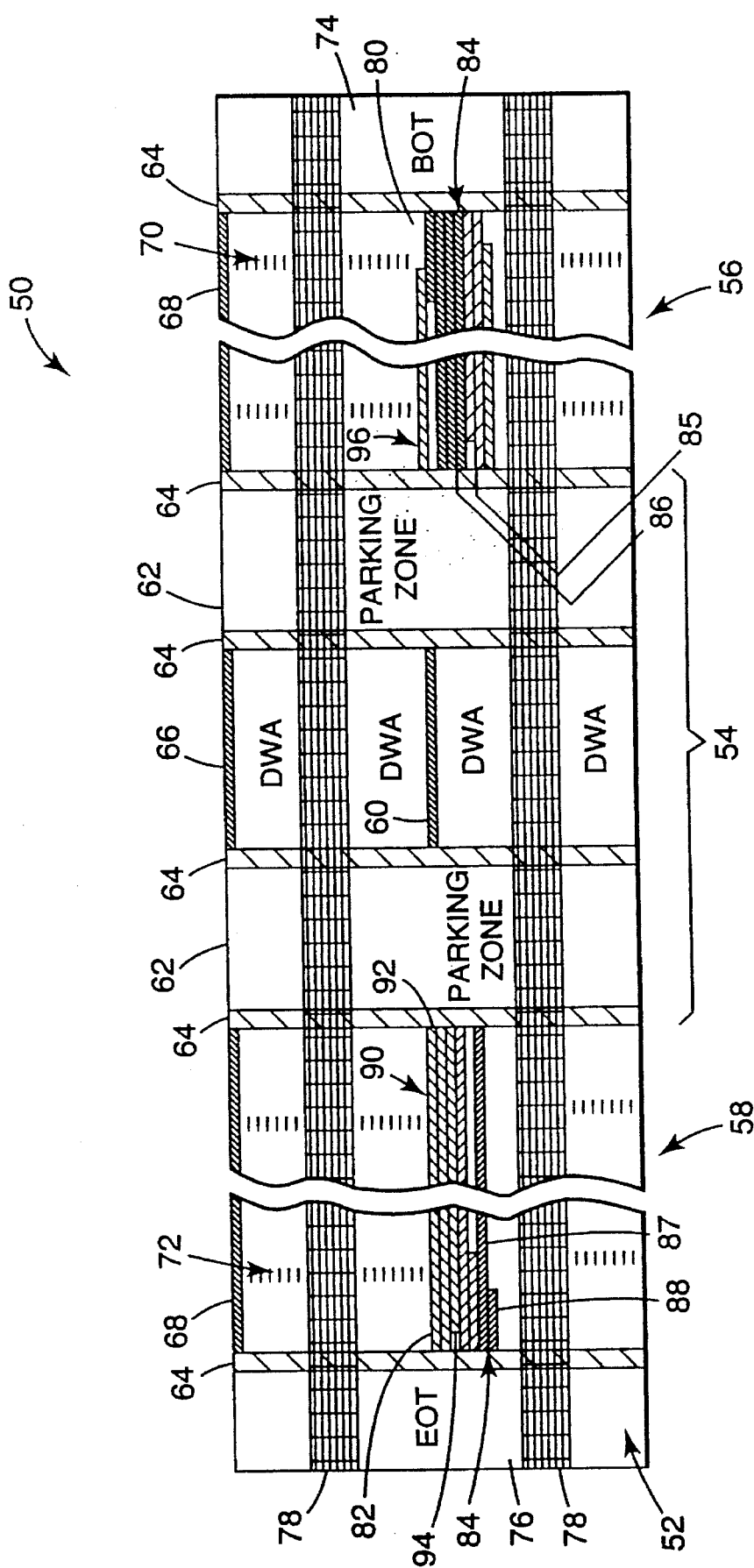
FIG. 2 is a schematic illustration of a first embodiment of the direct file access for magnetic tapes.

FIG. 2 is a schematic illustration of a preferred embodiment of the direct file access system 50 for magnetic tapes 52. A service region 54 is defined on the tape 52. First and second storage regions 56, 58 are defined adjacent to the service region 54. The service region 54 preferably includes a file directory 60 identifying the files located in the first and second data storage regions 56, 58. The service region 54 also includes at least one parking zone 62 in which no data is recorded, for parking the magnetic heads (not shown) on the tape 52. In the preferred embodiment a parking zone 62 is provided on both sides of the file directory 60 as a method of reducing the number of back hitches necessary to acquire servo tracks 78 when going in the direction opposite the orientation of the file directory 60.

In the preferred embodiment, magnetic markers 64 demarcate a Beginning of Tape (BOT) region 74 and an End of Tape (EOT) region 76 from the data storage regions 56, 58. The magnetic markers 64 also demarcate the parking zones 62, the file directory 60, and the other edge of the data storage regions 56, 58. Retensioning tracks 66 and/or 68 may be included in the service region 54 and/or in the data storage areas 56, 58.

The service region 54 may comprise 10 to 20 feet (3 to 6 m) of magnetic tape 52. When the tape 52 is stopped, the read/write heads (not shown) preferably are located in the parking zone 62 with one read channel roughly aligned with the file directory 60. When the tape 52 begins operational movement, the tape drive 10 performs the appropriate acquisition of servo track 78 in the parking zone 62 and reads the file directory 60 for the location of the record to be written or read. The read/write heads (not shown) then are moved to the appropriate track to begin either reading or writing the desired file.

Each data storage region 56, 58 has a plurality of data tracks 70, 72 which extend longitudinally along the length of the tape 52. All data files 80, 82 begin adjacent to the service region 54. For purposes of this application, a data file may contain one or more data records. If a file contains more than one record, the records preferably are written and read sequentially along the length of the magnetic tape. For long data files, it is possible to write a portion in each data storage region 56, 58, as will be discussed below.

For example, data file 90 begins at location 92 adjacent to the service region 54 and extends away therefrom, traversing a serpentine path in the data storage area 58. Since the file 90 is longer than the data track, the read/write heads merely turn around at the EOT 76 and continue recording the file 90 on an unused track. Data file 90 ends at location 94. In the preferred embodiment, the remainder of the file 90 is written to an adjacent track, although this is not required. In marked contrast to conventional file organizations, the next file also starts at the service region 54, not the end 94 of the file 90. Therefore, the tape 52 must be rewound to the service region 54 after the reading/writing of the file 90 is completed.

Data file 96 begins adjacent to the service region 54 and extends toward the BOT 74. Since the data file 96 is shorter than a complete track in data storage area 56, the tape 52 will need to be advanced to the service region 54 after the data file 96 is written/read.

On a tape drive having 144 tracks, the present direct file access tape system 50 utilizing service region 54 provides access to 288 files with an average access time of less than 2 seconds. A drive with 216 tracks would result in 432 direct access files utilizing the present direct file access for tape systems 50.

The tensioning track 68 is evaluated while the tape is being returned to the service region 54, or tensioning track 66 is evaluated once the read/write heads are returned to the service region 54, to determine if tape retensioning is necessary (as discussed further below), and the read/write heads are aligned with the file directory 60. The file directory 60 is then updated and the read/write heads are stopped in the parking zone 62. It will be understood that only one parking zone may be needed and that all operations may be initiated from that zone.

As discussed above, access time to data is increased due to automatic refresh or retensioning procedures. A retensioning cycle typically includes advancing the tape to the EOT and then rewinding to the BOT. A retensioning cycle preferably occurs every time a cartridge is loaded into a tape drive or when a predetermined number of tape tension reducing events have occurred. Tape tension reducing events include for example: the tape has been shuffled repeatedly along a short region of the tape (greater than 50 passes over a fixed region and less than the full tape length) or the temperature of the tape has changed by more than 30° F. (16° C.).

As illustrated in FIG. 1, the first embodiment of the system for reducing the number of retensioning passes includes a force transducer 32 proximate the read/write heads 30 of the tape drive 10 to monitor tape tension. If tape tension drops below a predetermined level, a retensioning pass is initiated.

In an alternate embodiment, a worst case data pattern, located on the retensioning tracks 66 and 68 in FIG. 2, may be written to the tape 52 in an area of normally lower tape tension. The retensioning tracks 66, 68 preferably are written to the track farthest from the reference datum (not shown) of the tape cartridge 14. The worst case data pattern is a pattern that is sensitive to increased head-to-tape separation due to loss of tape tension. The worst case data pattern is intended to produce the worst case amount of peak shift that is sensitive to signal loss. For example, the retensioning tracks 66, 68 may include a combination of "dibits" or "tribits" as exemplified by—0011000111000—where each "one" is a bit or flux reversal written on the tape.

Upon loading the cartridge 14 into the drive 10, the drive reads the retensioning tracks 66, 68 and compares the actual error rate to the expected error rate for that track. If the actual error rate is significantly greater than the expected error rate, a retensioning pass may be initiated.

Alternatively, the drive may read the retensioning tracks 66, 68 at fixed intervals to determine whether a retensioning sequence is required. In the preferred embodiment, the worst case data patterns 66, 68 are written to the upper track at the BOT or EOT, and/or the top track in the service region.

In yet another embodiment, the tape drive initiates a retensioning pass after a specified number of tape tension reducing events has occurred. For example, if the tape 52 has been shuffled repeatedly over a short segment a retensioning pass may be initiated.

Data files may also be arranged so that the full length of the tape 52 is traversed, causing the tape to be refreshed or retensioned. Data file 84 fills two complete tracks in the first data storage area 56, beginning at location 85 and ending at location 86. The remainder of data file 84 is written to tracks 87, 88 in the second data storage area 58. Consequently, reading or writing data file 84 automatically refreshes or retensions the tape 52.

Figure 3:
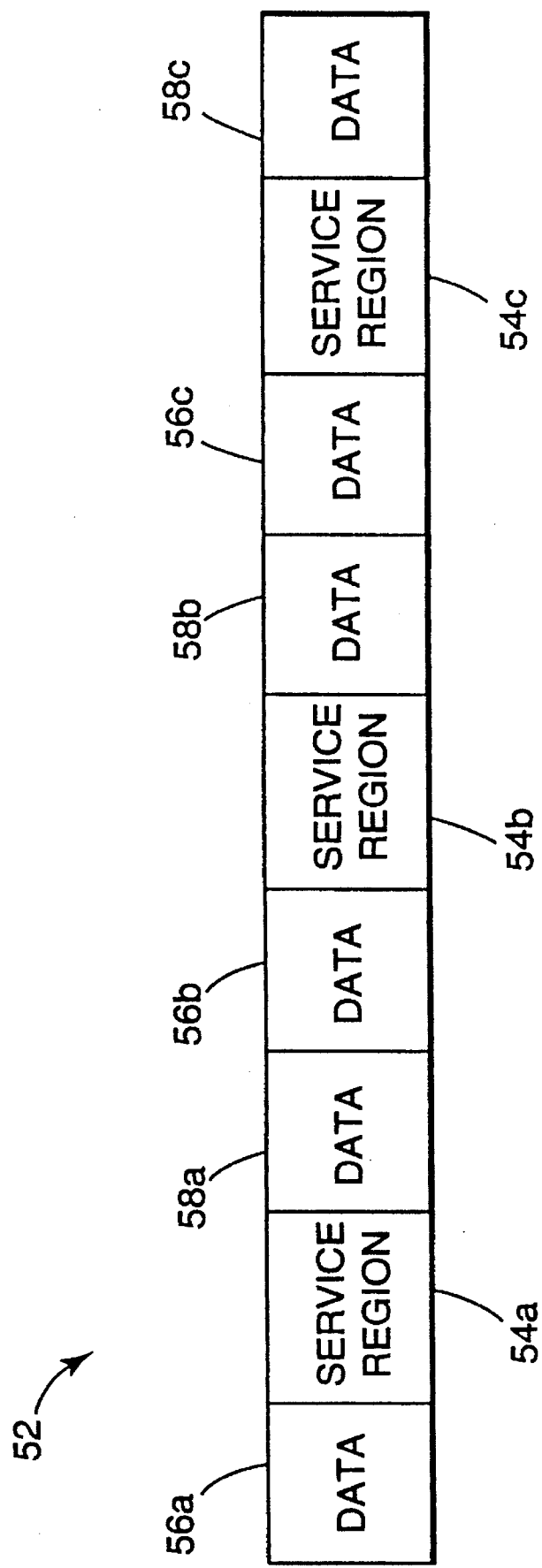
FIG. 3 is a schematic illustration of an alternate embodiment in which multiple service regions are arranged longitudinally along the tape.

FIG. 3 illustrates an alternative fast file access for tape systems in which three service regions 54a, 54b, 54c are provided at fixed intervals along the length of the tape 52. In this configuration, six data storage areas 56a, 58a, 56b, 58b, 56c, 58c are arranged along the length of the tape 52. Directory information and data are stored in each service region 54a–c and data storage areas 56a–c, 58a–c, respectively, in much the same fashion as in the previously described embodiment.

It will be understood by those skilled in the art that more than three service regions may be provided in some circumstances. For example, if numerous records of known length are to be stored on the tape 52, service regions can be arranged to create a plurality of data storage areas which approximate the size of the data files. In a tape configuration utilizing more than one service region, the tape 52 may be advanced to the service region adjacent to the desired record in a ballistic manner. However, in the preferred embodiment, only a single service region is provided on each tape in order to maintain the 2 second access time.

Figure 4:
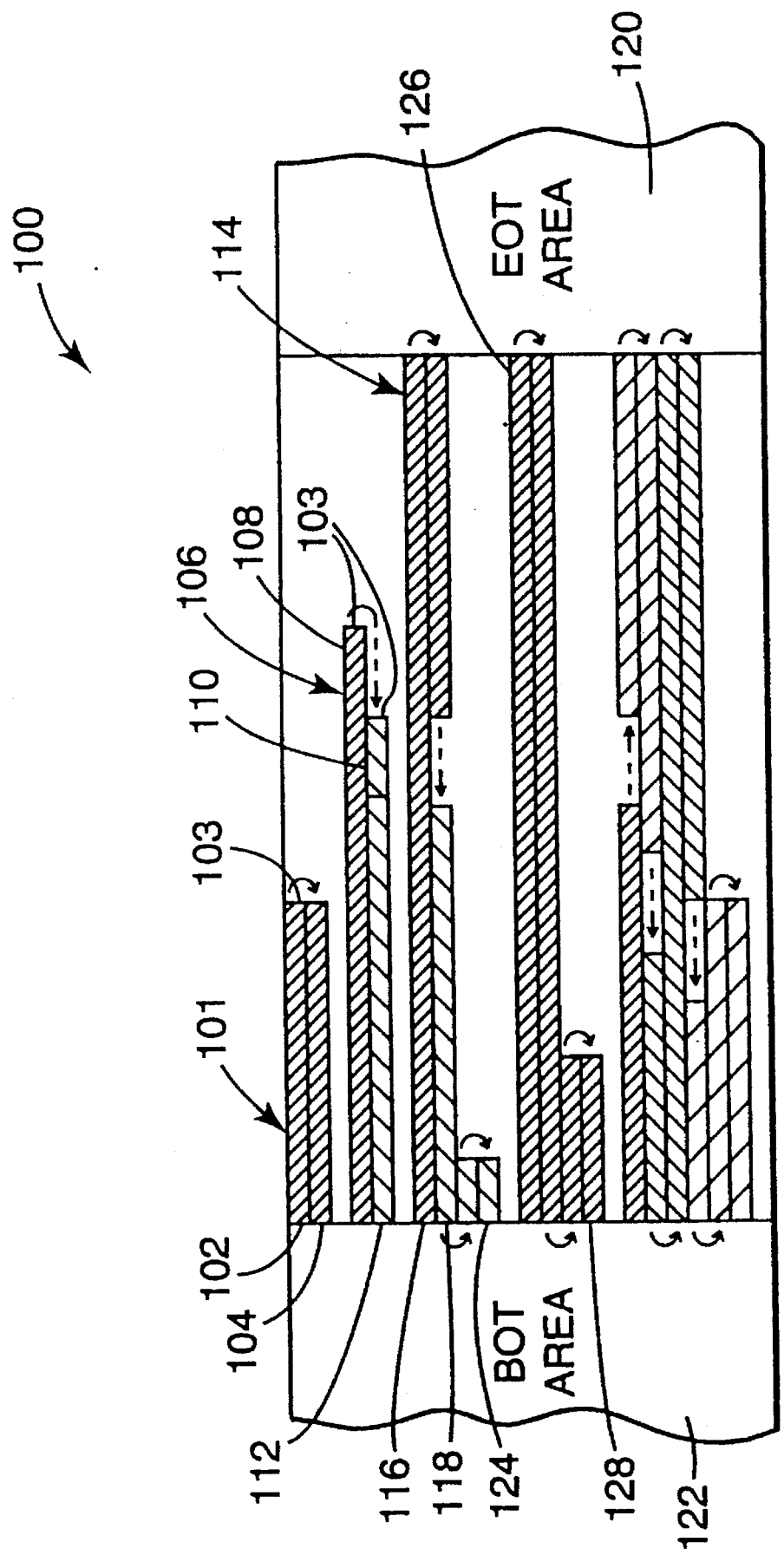
FIG. 4 is a schematic illustration of a preferred embodiment of the reduced rewind data configuration in which all data files begin and end at the BOT area.
Figure 5:
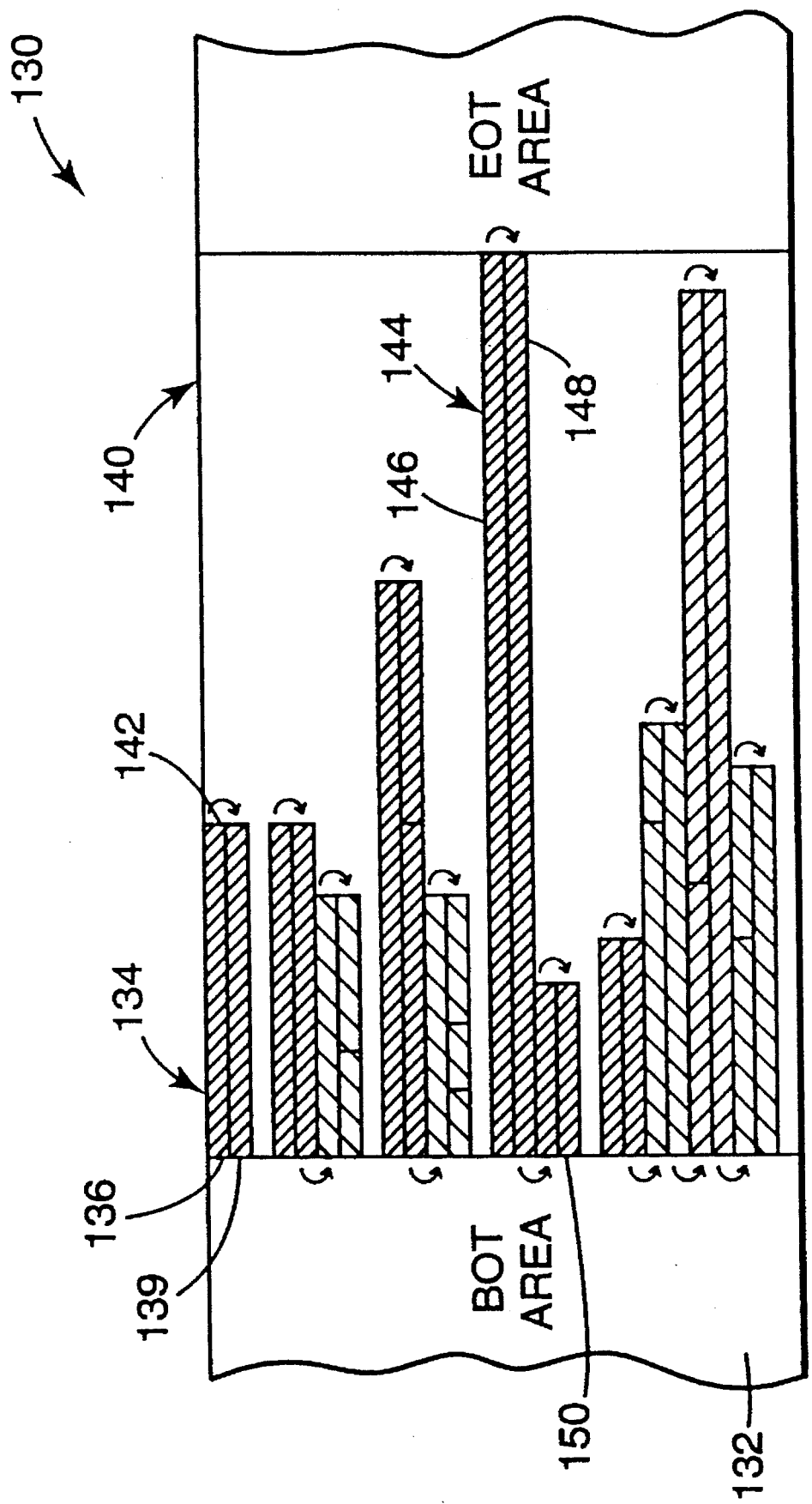
FIG. 5 is an alternate embodiment of the reduced rewind data configuration in which data files are divided into two portions so that all data files begin and end at the BOT area.

FIGS. 4 and 5 illustrate reduced rewind data configurations which may be used with the fast direct file access for tape systems discussed above. In particular, the data configurations of FIGS. 4 and 5 are designed to eliminate the rewind sequence after reading or writing a data file.

FIG. 4 illustrates a first embodiment of a reduced rewind data configuration 100 in which data records are concatenated within a file so that all files start and end at the BOT area. Data file 101 illustrates two records 102, 104 of generally equal length. In the preferred embodiment, a magnetic marker 103 is placed at the end of the record 102 so that the tape drive knows to change tracks to read/write the second record 104 in the file 101.

Data file 106 contains three records 108, 110 and 112. Since record 108 is slightly longer than the combined length of records 110 and 112, there is a short period of rewind between the end of record 108 and the beginning of record 110. Again, magnetic markers may be provided at the end of each record along the length of the data file 106.

Data 114 includes two files or records 116 and 118. The record 116 is longer than the data track. When the read/write head reaches the EOT (end of tape) area 120, the tape head (not shown) moves laterally across the tape to an empty data track and the remainder of the record 116 is written on another data track extending back towards the BOT area 122. In the preferred embodiment, the rest of the record 116 is written on the adjacent data track. The record 118 is appended to record 116 and extends the full distance back to the BOT 122 area. A remainder 124 of the record 118 is then divided into two generally equal portions and written on two data tracks so that the read/write heads terminate the write sequence at the BOT 122. In the preferred embodiment, the remainder 124 of record 118 is divided in half so that no rewind time is required. As discussed above, a significant portion of the tracks containing the remainder 124 are unused blank tape, highlighting the trade-off between the present reduced rewind data configuration and maximizing tape utilization.

Data file 126 illustrates an example of a file comprising a single large record. The file 126 begins at the BOT 122 and is written in conventional serpentine fashion out to the EOT area and back to the BOT area again. The remainder 122 is then divided into two generally equal portions and written on two preferably adjacent tracks so that the read/write heads terminate the write sequence at the BOT 128.

FIG. 5 is an alternate embodiment of the reduced rewind data configuration 130 of the present invention wherein the length of a data file is determined prior to writing it to the tape so that all files begin and end at the BOT 132 area.

Data file 134 is small enough to reside on two tracks of a data storage area 140. The data file 134 is divided into two generally equal portions 136, 139. The first portion 136 is written starting from the BOT area 132. The second portion 139 is written on a preferably adjacent track starting proximate at the end of the first portion 136 and extending back to the BOT 132. A magnetic marker 142 preferably is included at the end of the first portion 136 so that the tape drive recognizes that the remainder of the file 132 is written on a different track.

Data file 144 is larger than two data tracks. The file 144 is evaluated to determine the even number of whole data tracks 146, 148 required and the size of the remainder portion 150. The even number of data tracks 146, 148 are written to the tape and the remainder portion 150 is divided into two generally equal portions which are written on two separate tracks. Consequently, the data file 144 begins and ends at the BOT 132.

While it will be recognized that the reduced rewind data configurations illustrated in FIGS. 4 and 5 do not maximize tape utilization, the reduced access time achieved by eliminating the rewind sequence can be significant. As the cost of magnetic tape continues to decline, utilizing 50% or less of the tape capacity becomes less of a problem. Additionally, with future generations of tape cartridges capable of containing tens to hundreds of gigabytes of information, utilizing only 50% of the cartridge capacity is not critical. Finally, as new tape drives become available which can access multiple tapes, the present reduced rewind data configuration makes a huge amount of data storage capacity available with an extremely small access time. It also will be recognized that this design may require more cooperation between the tape drive and the associated computer. For maximum efficiency the computer should tell the tape drive the total size of the file before sending a file to the drive so that the drive can determine when to stop writing a file on one track and start on the next. Alternatively, but less efficiently, the drive can write the file using the fast direct file access system for tapes illustrated in FIG. 2, determine the size of the resulting file, then re-write the file according to the reduced rewind data configuration for tapes illustrated in FIGS. 4 and 5.

Figure 6:
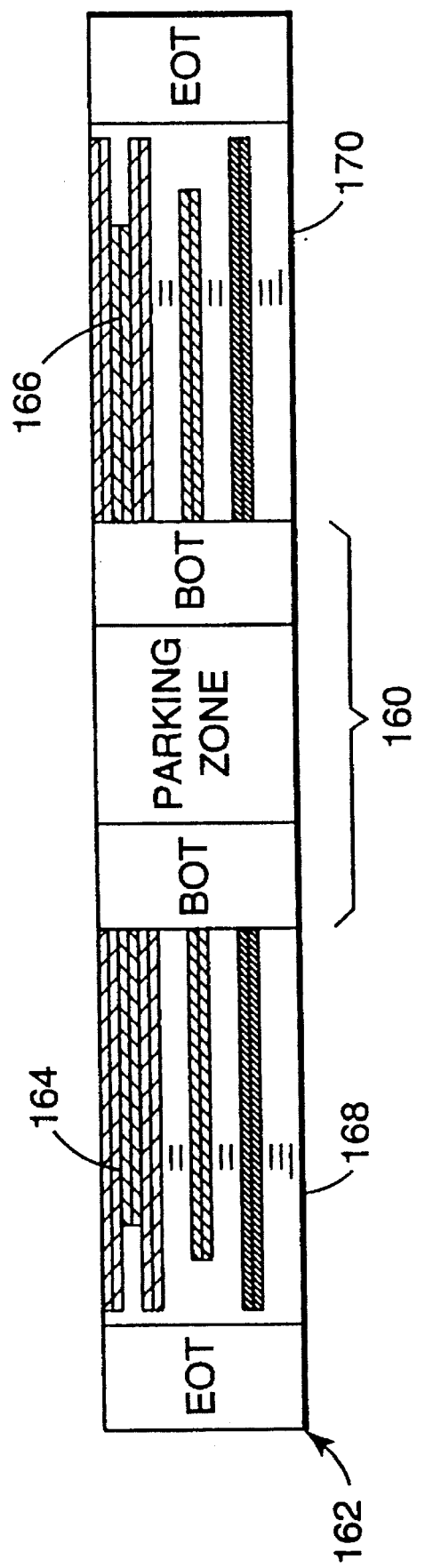
FIG. 6 is a schematic illustration of a magnetic tape utilizing the preferred direct file access system in combination with the reduced rewind data configuration.

FIG. 6 illustrates an embodiment which combines the fast direct file access system for tapes illustrated in FIG. 2 with the reduced rewind data configuration for tapes illustrated in FIGS. 4 and 5. In this embodiment, a service region 160 is provided proximate the center of the tape 162. Data files 164, 166 then are written in the two data storage areas 168, 170 defined on the tape using the reduced rewind data configurations discussed above.

FIG. 6 show two "BOT" and "EOT" regions on the tape. These are not the physical beginning of tape and end of tape, but are logical positions. With these logical dividers, the drive can read from/write to the tape going in either direction as if it were reading/writing from the beginning of a tape to the end of a tape. This allows use of much the same control systems and algorithms as used with conventional tape formats.

The embodiment illustrated in FIG. 6 is particularly useful for storing records of a known maximum length, such as X-rays. Since the individual files may be shorter than the length of the tape, one or more service regions can be placed along the length of the tape to create a plurality of data storage regions which correspond to the size of the X-rays (see FIG. 3). Table 1 illustrates the length of tape required to store several typical types of records and their corresponding densities in kilobits per inch (kbpi), kilobytes per foot (kB/ft), or kilobytes per centimeter (kB/cm):

TABLE 1

Record Lengths for Several Bit Densities

| | HDTV (920 × 1960) | Std. X-ray | Chest X-ray | Large Color Picture |
|---|---|---|---|---|
| Size (MB) | 5.53 | 10 | 20 | 100 |
| Density | Length in feet/folded as in FIGS. 4 & 5 | | | |
| | Length in m/folded as in FIGS. 4 & 5 | | | |
| 12.5 kbpi | 293/147 | 533/267 | 1067/533 | 5333/2667 |
| 18.7 kB/ft | 89.3/44.7 | 162/81 | 325/163 | 162/81 |
| 3.97 kB/cm | | | | |
| 67.7 kbpi | 54/27 | 98/49 | 197/98 | 984/492 |
| 101.6 kB/ft | 16.5/8.2 | 29.9/14.9 | 60.0/30.0 | 300/150 |
| 21.5 kB/cm | | | | |
| 100 kbpi | 37/18 | 67/33 | 133/67 | 667/333 |
| 150 kB/ft | 11.3/5.6 | 20.4/10.2 | 40.5/20.3 | 203/102 |
| 31.7 kB/cm | | | | |
| 150.0 kbpi | 24/12 | 44/22 | 89/44 | 444/222 |
| 225 kB/ft | 7.3/3.7 | 13.4/6.7 | 27.1/13.6 | 135/67.7 |
| 47.6 kB/cm | | | | |

While all of the above embodiments have been described with files, markers, services regions and the like ending at precise locations, one of skill in the art will understand that a small buffer zone usually should be provided between regions on the tape, at the ends of files and the like to allow for variability in the tape, tape drive, temperature, humidity and the like. Particularly when determining how to divide a file between tracks so that it ends back at the service region, such a buffer zone should be included in the calculation.

It should be understood that the exemplary embodiments illustrated above in no way limit the scope of the invention. Other modifications of the invention will be apparent to those skilled in the art in view of the foregoing descriptions. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and broad scope of the appended claims are covered.

We claim:

1. A direct file access system for a magnetic tape, comprising:

a magnetic tape having a beginning area, an ending area, and a center area arranged longitudinally along the tape;

at least one service region on the tape proximate the center area;

first and second data storage areas for storing data files on the tape, the first data storage area having a plurality of data tracks extending longitudinally along the tape between the service region and the beginning area, the second data storage area having a plurality of data tracks extending longitudinally along the tape between the service region and the ending area; and a plurality of data files in the first and second storage areas, all such data files being separated into first and second portions, the first portion being written on a first data track in a direction starting adjacent to the service region and extending away therefrom to an ending location, and the second portion being written on a second data track beginning proximate the ending location of the first portion and extending toward the service region and ending adjacent to the service area.

2. The direct file access system of claim 1 further comprising magnetic markers identifying the locations where the storage areas intersect the beginning area, the ending area, and the service region.

3. The direct file access system of claim 1 wherein the magnetic tape comprises more than one such service region spaced along the tape designating multiple such data storage areas.

4. The direct file access system of claim 1 wherein the first and second portions of the data file each comprise approximately half of the data file.

5. The direct file access system of claim 1 wherein the first and second data tracks are adjacent data tracks.

6. The direct file access system of claim 1 wherein the data file is divided into a primary portion requiring an even number of data tracks and a remainder portion, the primary portion being written on the magnetic tape to an even number of data tracks starting adjacent to the service region and ending adjacent to the service region, and the remainder portion being separated into first and second portions, the first portion being written on a data track beginning adjacent to the service region in a direction extending away from the service region and the second portion of the data file being written on another data track ending adjacent to the service region.

7. The direct file access system of claim 6 wherein the first and second portions of the remainder portion are written on adjacent data tracks.

8. The direct file access system of claim 1 wherein the magnetic tape includes at least one retensioning track.

9. The direct file access system of claim 8 wherein the retensioning track includes a worst case data pattern.

10. The direct file access system of claim 8 wherein the retensioning track is located in the service region.

11. The direct file access system of claim 8 wherein the retensioning track is located in at least one of the data storage areas.

12. The direct file access system of claim 1 wherein only one data track is written at a time.

13. The direct file access system of claim 1 wherein a single data file traverses data tracks in both the first and second data storage areas.

14. A direct file access system for a magnetic tape, comprising:

a tape drive;

a magnetic tape mounted in the tape drive, the magnetic tape comprising:

a beginning area, an ending area, and a center area arranged longitudinally along the tape;

a service region on the tape proximate the center area;

first and second data storage areas on the tape located adjacent to the service region for containing data files, the first data storage area having a plurality of data tracks extending longitudinally between the service region and the beginning area, and the second data storage area having a plurality of data tracks extending longitudinally between the service region and the ending area;

data storage means in the tape drive having heads proximate a read/write location for reading and writing data on the magnetic tape and means for advancing the magnetic tape past the read/write location for reading and writing data files in the first and second storage areas, with one portion of each file in the plurality of data files in the first and second storage areas beginning adjacent to the service region and extending longitudinally along a track away from the service region, and another portion extending longitudinally along a track toward the service region and ending adjacent to the service region.

15. The direct file access system of claim 14 wherein the magnetic tape includes a file directory for identifying data files located in the first and second data storage areas.

16. The direct file access system of claim 15 wherein the file directory is located in the service region.

17. The direct file access system of claim 14 wherein the service region includes a parking zone for locating the heads when the tape is not being advanced past the location.

18. The direct file access system of claim 14 wherein the tape is contained in a cartridge.

19. The direct file access system of claim 14 wherein the magnetic tape further includes magnetic markers adjacent to the first and second data storage areas.

20. The direct file access system of claim 14 wherein the first and second portions of a data file each comprise approximately half of the data file.

21. The direct file access system of claim 14 wherein the data storage means comprises:

dividing means for dividing a data file into a primary portion requiring an even number of data tracks and a remainder portion, the dividing means including means for dividing the remainder portion into a first portion and a second portion; and writing means for writing the primary portion to an even number of data tracks on the magnetic tape and for writing the first portion of the remainder portion on a data track beginning adjacent to the service region and the second portion on another data track ending adjacent to the service region.

22. The direct file access system of claim 21 wherein the writing means writes the primary portion of the files in a serpentine path along adjacent tracks in either the first or second data storage areas.

23. The direct file access system of claim 14 wherein the data storage means includes positioning means for positioning the tape so that the read/write heads are located in the service region after the data file has been written to the tape.

24. The direct file access system of claim 14 wherein the tape drive includes sensor means for monitoring the tension of the magnetic tape in the read/write location.

25. The direct file access system of claim 24 wherein the sensor means initiates a retensioning cycle if the tension of the magnetic tape drops below a predetermined level.

26. The direct file access system of claim 14 wherein the tape drive includes means for monitoring the number of tape tension reducing events and for initiating a retensioning cycle if a predetermined number of tape tension reducing events has occurred.

27. The direct file access system of claim 14 wherein the heads read and write data to only one data track at a time.

28. The direct file access system of claim 14 wherein the data storage means includes means for writing a single data file that traverses data tracks in both the first and second data storage areas.

29. A method for creating a direct file access system for a magnetic tape, comprising the steps of:

providing a magnetic tape having a beginning area, an ending area, and a center area arranged longitudinally along the tape;

defining at least one service region on the tape proximate the center area;

defining first and second data storage areas for storing data files on the tape, the first data storage area having a plurality of data tracks extending longitudinally along the tape between the service region and the beginning area, the second data storage area having a plurality of data tracks extending longitudinally along the tape between the service region and the ending area;

separating each of a plurality of data files into first and second portions;

writing the first portion of each data file on a first data track in a direction extending away from the service region; and writing the second portion of each data file on a second data track ending adjacent to the service region.

30. The method of claim 29 further including the step of writing magnetic markers on the tape to identify the location where the first storage area intersects the beginning area and the service region.

31. The method of claim 29 wherein the magnetic tape includes more than one such service region designating multiple such data storage areas.

32. The method of claim 29 wherein the first and second portions of the data file each comprise approximately half of the data file.

33. The method of claim 29 wherein the first and second portions are written on adjacent data tracks.

34. The method of claim 29 further including the steps of:

dividing a data file into a primary portion requiring an even number of data tracks and a remainder portion;

writing the primary portion on the magnetic tape to an even number of data tracks starting adjacent to the service region and ending adjacent to the service region;

separating the remainder portion into first and second portions;

writing the first portion on a data track beginning adjacent to the service region in a direction extending away from the service region; and writing the second portion of the data file on another data track ending adjacent to the service region.

35. The method of claim 34 wherein the first and second portions of the remainder portion are written on adjacent data tracks.

36. The method of claim 29 wherein the magnetic tape includes at least one retensioning track.

37. The method of claim 36 wherein the retensioning track includes a worst case data pattern.

38. The method of claim 36 wherein the retensioning track is located in the service region.

39. The method of claim 36 wherein the retensioning track is located in at least one of the data storage areas.

40. The method of claim 29 wherein the data tracks are written one at a time.

41. The method of claim 29 wherein a single data file traverses data tracks in both the first and second data storage areas.

42. A method for creating a direct file access system for a magnetic tape, comprising the steps of:

providing a tape drive having heads proximate a read/write location for reading and writing data on the magnetic tape and means for advancing the magnetic tape past the read/write location;

providing a magnetic tape mounted in the tape drive for engagement with the heads;

defining a beginning area, an ending area, and a center area longitudinally along the tape;

defining a service region on the tape proximate the center area;

defining first and second data storage areas on the tape located adjacent to the service region for containing data files, the first data storage area having a plurality of data tracks extending longitudinally between the service region and the beginning area, and the second data storage area having a plurality of data tracks extending longitudinally between the service region and the ending area;

reading and writing a portion of each data file on a first data track in a direction extending away from the service region; and reading and writing a second portion of each data file on a second data track ending adjacent to the service region.

43. The method of claim 42 further including the step of defining a file directory on the magnetic tape for identifying data files located in the first and second data storage areas.

44. The method of claim 43 wherein the file directory is located in the service region.

45. The method of claim 42 wherein the service region includes a parking zone for locating the heads when the tape is not being advanced past the read/write location.

46. The method of claim 42 wherein the tape is contained in a cartridge.

47. The method of claim 42 further including the step of defining magnetic markers adjacent to the first and second data storage areas.

48. The method of claim 42 wherein the first and second portions of the data file each comprise approximately half of the data file.

49. The method of claim 42 wherein the step of reading and writing data files comprises the steps of:

dividing a data file into a primary portion requiring an even number of data tracks and a remainder portion;

dividing the remainder portion into a first portion and a second portion;

writing the primary portion to an even number of data tracks on the magnetic tape; and writing the first portion of the remainder portion on a data track beginning adjacent to the service region and the second portion on another data track ending adjacent to the service region.

50. The method of claim 49 wherein the primary portion of the files is written in a serpentine path along adjacent tracks in either the first or second data storage areas.

51. The method of claim 42 further including the step of positioning the tape so that the heads are located in the service region after the data file has been written to the tape.

52. The method of claim 42 wherein the tape drive includes sensor means for monitoring the tension of the magnetic tape in the read/write location.

53. The method of claim 52 wherein the sensor means initiates a retensioning cycle if the tension of the magnetic tape drops below a predetermined level.

54. The method of claim 42 further including the steps of:

monitoring the number of tape tension reducing events; and initiating a retensioning cycle if a predetermined number of tape tension reducing events has occurred.

55. The method of claim 42 wherein the heads read and write data on only one data track at a time.

56. The method of claim 42 further including the step of writing a single data file that traverses data tracks in both the first and second data storage areas.

* * * * *

UNITED STATES PATENT AND TRADEMARK OFFICE
CERTIFICATE OF CORRECTION

PATENT NO.: 5,572,378

DATED: November 5, 1996

INVENTOR(S): Schwarz et al.

It is certified that error appears in the above-identified patent and that said Letters Patent is hereby corrected as shown below:

Col. 10, line 19, "the location" should be --the read/write location--.

Signed and Sealed this

Twenty-fourth Day of June, 1997

Attest:

BRUCE LEHMAN

*Attesting Officer*          Commissioner of Patents and Trademarks